United States Patent [19]

Clostermeyer et al.

[11] 4,185,446
[45] Jan. 29, 1980

[54] BALE-FORMING DEVICE

[75] Inventors: Gerhard Clostermeyer, Gütersloh; Heinz Jaross, Harsewinkel, both of Fed. Rep. of Germany

[73] Assignee: Gebr. Claas Maschinenfabrik GmbH, Harsewinkel, Fed. Rep. of Germany

[21] Appl. No.: 854,496

[22] Filed: Nov. 23, 1977

[30] Foreign Application Priority Data

Nov. 24, 1976 [DE] Fed. Rep. of Germany ....... 2653318

[51] Int. Cl.² ............................................ A01O 87/00
[52] U.S. Cl. ........................................ 56/344; 100/189
[58] Field of Search ............... 56/341, 344, 343, 361, 56/350, 346; 100/50, 45, 187, 188, 189, 192

[56] References Cited

U.S. PATENT DOCUMENTS

| | | | |
|---|---|---|---|
| 2,684,802 | 7/1954 | Rothwell | 100/192 |
| 2,940,383 | 6/1960 | Claas | 100/192 |
| 3,179,040 | 4/1965 | Seltzer | 100/192 |
| 3,410,427 | 11/1968 | McCarthy | 100/50 |
| 3,467,000 | 9/1969 | Seltzer | 100/192 |
| 3,534,537 | 10/1970 | Buchele et al. | 56/341 |
| 3,552,109 | 1/1971 | Murray et al. | 56/344 |
| 3,744,228 | 7/1973 | Lundahl | 56/344 |
| 3,789,752 | 2/1974 | Wirz | 100/192 |
| 3,931,702 | 1/1976 | Soteropulos et al. | 56/341 |
| 3,965,660 | 6/1976 | Kanengieter et al. | 56/344 |

Primary Examiner—Russell R. Kinsey
Assistant Examiner—Paul J. Hirsch
Attorney, Agent, or Firm—Michael J. Striker

[57] ABSTRACT

A device for forming bales of hay, straw or similar crops includes a container in which there is yieldably mounted a holding member situated between the inlet end and the outlet end of the baling chamber of the container. The device picks crops up from the ground and advances the same into the inlet end of the baling chamber so that the crops form a bale thereat, and the holding member presses against the forming bale for the entire duration of the formation of the bale. The holding member retards the advancement of the forming bale toward the outlet end of the baling chamber and yields only after the material of the forming bale has reached a desired degree of packing. The holding member may be a flap pivoted in the container or a shield mounted on a tiltable frame for movement relative thereto and for tilting therewith. At the beginning of the baling operation, the flap or the shield extend across the baling chamber intermediate the inlet and outlet ends thereof and the flap is gradually pivoted, and the shield gradually shifted, by the advancing forming bale. The pivoting of the flap and the displacement of the shield are controlled either by a hydraulic arrangement or a braking arrangement.

12 Claims, 2 Drawing Figures

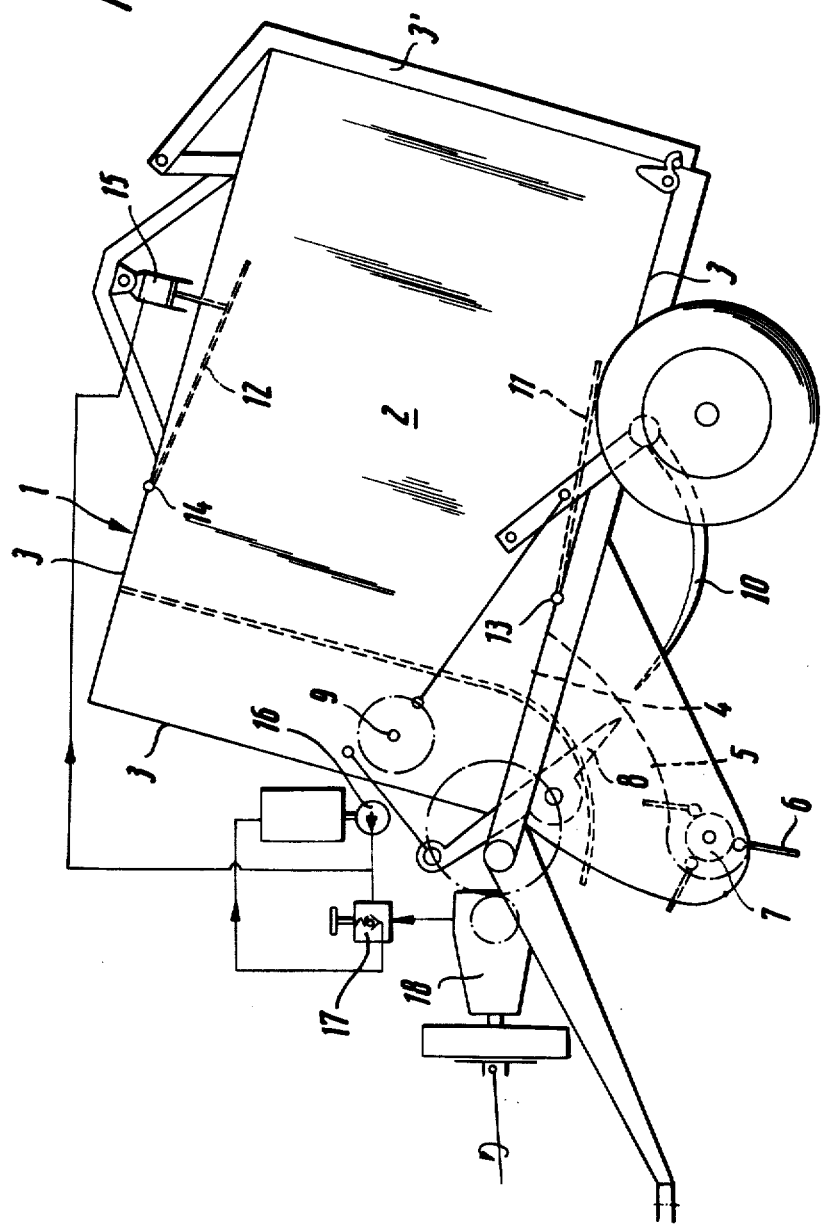

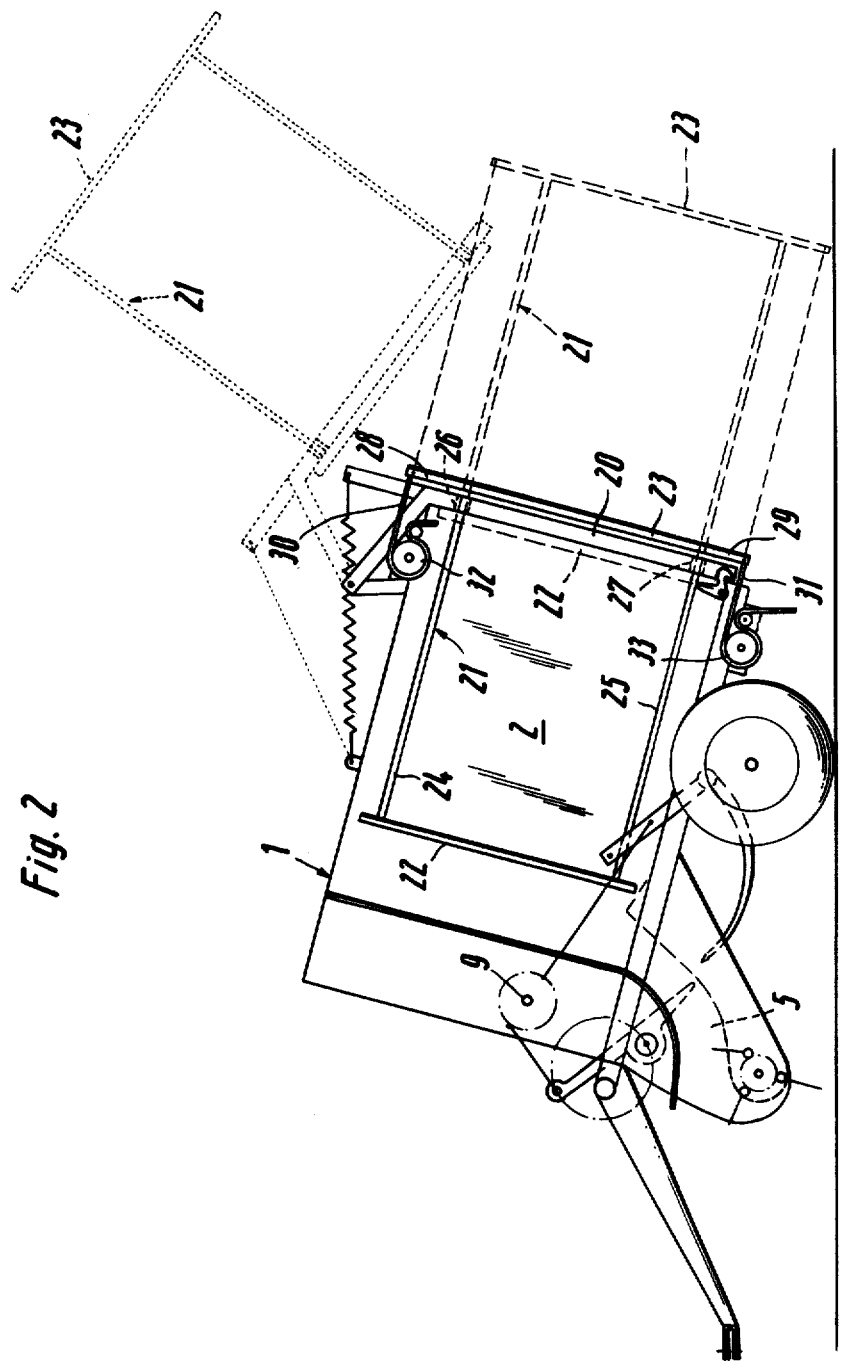

BALE-FORMING DEVICE

BACKGROUND OF THE INVENTION

The present invention relates to a bale-forming device in general, and more particularly to a bale-forming device for agricultural uses.

There have already been proposed various devices of the latter type. So, for instance, there is already known a bale-forming implement equipped with a bale-forming charging arrangement. This conventional agricultural implement includes walls which delimit a baling chamber which has an inlet end at the front, and an outlet end at the rear, of the implement as considered in the advancement direction thereof. Then, there is provided an inlet opening in the bottom of the baling chamber at the inlet end thereof which extends substantially over the entire width of the baling chamber. This implement further has equipment which picks hay or a similar crop up from the ground during the movement of the implement and which delivers the picked-up crop material into a guiding channel which communicates with the inlet opening. In the guiding channel, a respective charge of the picked-up material is advanced through the guiding channel into the inlet end of the baling chamber by packing fingers or prongs so that a bale is formed at the inlet end of the baling chamber and advances, as further charges are advanced by the packing fingers from the guiding channel into the inlet portion of the baling chamber, toward the outlet end of the baling chamber. Furthermore, this implement is equipped with means for tying the fully formed bale still in the baling chamber.

A device of the above-discussed type is disclosed, for instance, in the German published patent application No. 1,782,382. In this device, the material to be baled is advanced into the baling chamber by an oscillating advancing arrangement, at considerably different pressures. This is attributable to the fact that, at the commencement of the formation of a new bale, the previously formed bale is first pressed by the following material out of the baling chamber. The pressure exerted on the material being baled by the oscillating advancing arrangement is not very high inasmuch as an outlet door arranged at the rear end of the implement is open under these circumstances and the previously formed bale can be shifted out of the baling chamber without offering much resistance to such shifting. As soon as the previously formed bale leaves the baling chamber and the rear door or flap is again closed, the pressure exerted on the newly forming bale decreases further at first and increases only after the baling chamber has been filled with the crop material. The highest pressure, which is delimited by the strength of the device and the available power input, is achieved only during the end phase of the formation of the bale. During this end phase, the material being baled is compacted at the packing fingers to such extent that its structure is changed and thus its expansion capacity is considerably attenuated. However, the material which has been so pre-compressed to a high density takes up only about one-fourth of the volume of the bale. Inasmuch as the pressure which is exerted by the packing fingers on the material of the bale is not uniformly distributed throughout the baling chamber, the remaining material retains a lower density and a high expansion capacity, which results in a high loading of the tying twine or twines after the bale has been discharged from the baling chamber. This, of course, is very disadvantageous. An additional disadvantage of the above-discussed prior-art device is that, due to the non-uniform density of the bale the latter will contain much less of the crop material than could be otherwise accommodated in the same space.

SUMMARY OF THE INVENTION

Accordingly, it is a general object of the present invention to avoid the disadvantages of the prior art.

More particularly, it is an object of the present invention to so design an agricultural bale-forming device as to be capable of achieving a substantially uniform density and the desired degree of packing of the crop material throughout the bale.

A concomitant object of the present invention is to develop a bale-forming device which is simple in construction, inexpensive to manufacture, and reliable in operation.

In pursuance of these objects and others which will become apparent hereafter, one feature of the present invention resides, in a bale-forming device, briefly stated, in a combination comprising container means displaceable on the ground and bounding a baling chamber having an inlet end and another end; guiding means bounding a guiding channel communicating with the inlet end of the baling chamber and having an inlet opening facing the ground; means for picking material to be baled up from the ground and for delivering the same into the guiding channel through the inlet opening thereof; and means for packing the material into the baling chamber, which includes means for advancing the material through the guiding channel into the inlet end of the baling chamber to form a bale therein, and holding means engaging the forming bale in an area contact therewith and acting on the forming bale against the action of the advancing means thereon for the entire course of the formation of the bale. Advantageously, the advancing means includes a plurality of compressing fingers which travel in respective trajectories in at least a part of each of which the respective compressing finger extends into the guiding channel. The device further preferably comprises means for tying the formed bale while still in the baling chamber.

The holding means of the present invention may include at least one flap, and means for so pivotally mounting the flap on the container means that the flap extends into the baling chamber and yields to the forming bale when the material of the latter has reached a predetermined degree of packing. Advantageously, the mounting means includes a pivot having a pivot axis extending transversely of the direction of advancement of the forming bale toward the other end of the baling chamber. In a currently preferred embodiment of the present invention, the pivot mounts the flap at least on one of the lateral walls of the container means which extend alongside and between the ends of the baling chamber.

According to a further embodiment of the present invention, the holding means includes at least one shield accommodated in the baling chamber for movement, and means for retarding the movement of the shield. Such retarding means advantageously includes at least one drum brake, and at least one pulling member connecting the shield to the drum brake. It is further proposed by the present invention to advantageously locate the shield intermediate the ends of the baling chamber so as to extend across the baling chamber. Advantageously, the holding means further includes a frame tiltably connected to the container means, and then the shield is mounted on the frame for movement relative thereto and for tilting therewith.

As mentioned previously, the holding means of the present invention includes at least one holding member accommodated in the baling chamber, such as the flap or the shield. Then, a biasing means is preferably so arranged that it acts on the holding member to press the same against the forming bale. The biasing means may include at least one hydraulically energized unit, such as a cylinder-and-piston unit, a source of a pressurized hydraulic fluid, and a hydraulic circuit interconnecting the cylinder-and-piston unit with the source.

The holding means of the present invention may further include means for controlling the force with which the cylinder-and-piston unit acts on the holding member, such controlling means including an adjustable pressure-relief valve interposed in the hydraulic circuit.

The device of the present invention further comprises driving means which includes at least one elastically deformable driving member. Then, the device further comprises means for controlling the pressure-relief valve in dependence on the amount of elastic deformation of the driving member. The amount of elastic deformation of the driving member being dependent on the loading of the driving means, the control of the pressure-relief valve in dependence on the elastic deformation avoids any overloading of the driving means while simultaneously assuring the desired degree of compaction of the material in the forming bale.

Instead of being hydraulically energized, the biasing means may be energized either pneumatically or mechanically, or in any other suitable conventional way.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a somewhat diagrammatic side elevational view of an agricultural implement of the present invention with a holding member in the form of a pivoted flap; and FIG. 2 is a view similar to FIG. 1 but with a holding member in the form of a movable shield.

DETAILED DISCUSSION OF THE PREFERRED EMBODIMENTS

Referring now to the drawing in detail, it may be seen therein that the reference numeral 1 designates a bale-forming agricultural implement in toto. The implement 1, which is illustrated as a loadable trailer, includes walls 3 which together bound a baling or charging chamber 2.

As illustrated in FIG. 1, the implement 1 includes a rear wall 3' which rearwardly delimits the baling chamber 2 and which is mounted on the top one of the walls 3 for pivoting.

A charging opening 4 is provided at the forward end of the bottom one of the walls 3 and extends substantially over the entire width of the baling chamber 2. A guiding channel 5 communicates with the charging opening 4, and a pick-up drum 7 equipped with tines 6 and driven in rotation during the operation of the implement 1, as well as packing fingers 8, are associated and cooperate with the guiding channel 5 in a conventional manner.

The implement 1 further includes tying needles 10 driven by a shaft 9, again in a conventional manner. The shaft 9 simultaneously drives non-illustrated conventional knot-tying mechanisms which are so constructed as to form knots on non-illustrated twines which extend around a bale which is being formed in the baling chamber 2 in a way which will be discussed later, so as to tie the fully formed bale while still in the baling chamber 2.

As further illustrated in FIG. 1, two pressing flaps 11 and 12 are pivotally connected at the top and bottom ones of the walls 3 by means of pivots 13 and 14. The flaps 11 and 12 extend rearwardly from the pivots 13 and 14, respectively, and a hydraulic cylinder-and-piston unit 15 is connected to the respective one of the top and bottom walls 3 and to the respective one of the flaps 11,12 at the end of the latter which is remote from the respective pivot 13, 14. In order not to unduly encumber the drawings, the lower unit 15, which is constructed and functions in the same way as the hopper unit 15, has been omitted from the drawing.

The implement 1 further includes a source of a pressurized hydraulic fluid, such as a pump 16, and a hydraulic circuit which communicates the pump 16 with the unit 15. A pressure-relief valve 17 is interposed in the above-mentioned hydraulic circuit. The pressure-relief valve 17 is adjustable and is operative for maintaining the pressure in the hydraulic circuit at a constant predetermined level.

The pressure-relief valve 17 is connected, in a conventional manner, with a transmission 18, in such a manner that, when the loading of the transmission 18 exceeds a predetermined level, accompanied by an elastic deformation of a component of the transmission 18, the pressure-relief valve 17 is opened so that the pressure in the above-mentioned hydraulic circuit is relieved to the extent necessary for reducing the loading of the transmission 18 to below the above-mentioned predetermined level. In this manner, it is assured not only that the transmission 18 will not be overloaded, but also that the pressure exerted by the flaps 11 and 12 due to the force applied to the flaps 11, 12 by the hydraulic units 15 will be maintained at a constant level, resulting in a uniform compression of the material of the forming bale.

The flaps 11, 12, which are fully extended, that is, extend fully across the baling chamber 2, at the commencement of the formation of the bale in the baling chamber 2, retard the advancement of the forming bale from the inlet end of the baling chamber 2 toward the outlet end of the baling chamber 2 which is located at the rear wall 3'. Due to the retardation of the advancement of the forming bale in the baling chamber 2, there is obtained a high and uniform degree of compaction of the crop material in the forming bale during the entire course of the formation thereof. This is attributable to the fact that the flaps 11, 12 which extend into the baling chamber 2 do not permit further advancement of the crop material toward the outlet end of the baling chamber 2 until the pressure within the forming bale, and thus the degree of packing of the material in the forming bale, have reached a predetermined level. When this happens, that is, when the predetermined level is reached, the flaps 11, 12 will yield against the force exerted thereon by the hydraulic units 15 and permit the forming bale to advance toward the rear wall 3', whereby the pressure in the forming bale drops again and has to build up again by the addition of further crop material to the trailing end of the forming bale before further advancement of the forming bale can occur. The entire process is repeated until the baling chamber 2 is completely filled with the packed crop material, whereupon the needles 10 and the associated knot-tying mechanisms are energized to tie the twines about the fully formed bale which is then discharged from the baling chamber 2 after the rear wall 3' has been lifted.

It will be appreciated that the packing of the crop material, which is picked up from the ground by the tines 6 and delivered thereby into the guiding chamber 5, is accomplished by the packing fingers 8 which extend into the guiding channel 5 at least during the travel thereof in a part of their respective trajectories, and that this is accomplished in an entirely conventional manner so that no detailed discussion of the function of these conventional parts of the implement 1 and of the means for driving and controlling the operation of the same is needed. Suffice it to say that, as the fingers 8 advance the crop material picked up by the tines 6 through the guiding channel 5 and into the baling chamber 2 at the inlet end thereof, they exert pressure on the crop material being advanced which, in turn, transmits such pressure to the crop material already present in the baling chamber 2 and that the above-discussed action of the packing fingers 8 on the crop material thus results in the build-up of the pressure in the material of the forming bale.

Referring now to FIG. 2 of the drawing, it may be seen that the implement 1 illustrated therein is in many respects similar to that disclosed in FIG. 1 so that the same reference numerals have been used to designate similar parts. However, instead of the closed rear wall 3' of FIG. 1, there is provided in FIG. 2 a tiltable support frame 20. Another frame 21 is supported on the support frame 20, in a sliding fashion. The other frame 21 includes a shield 22 at its forward end as considered in the direction of movement of the implement 1, a transverse member 23 located at the rearward end of the other frame 21, and a plurality of elongated beams 24 and 25 interconnecting the shield 22 with the transverse member 23. Bearings 26 and 27 support the elongated beams 24 and 25 on the tiltable support frame 20.

The transverse member 23 has respective upper and lower ends 28 and 29, and pulling members 30 and 31, such as cables, bands or the like, are connected to the respective ends 28, 29 of the transverse member 23 and are respectively trained about drum brakes 32 and 33.

When the baling chamber 2 is empty, the other frame 21 is extended forwardly into the baling chamber 2, as a result of which the forwardly located shield 25 drastically reduces the useful space of the baling chamber 2. Thus, only a slot-shaped section of the baling chamber 2 directly communicates with the guiding channel 5, and only this slot-shaped section of the baling chamber 2 is filled with the crop material at the beginning of the formation of the respective bale.

During the continuation of the packing operation, the crop material present in the baling chamber 2 is packed by the action of the packing fingers 8 on the crop material being advanced thereby through the guiding channel 5. Only when the crop material present in the baling chamber has been compacted to such a degree that the pressure exerted thereby on the shield 22 exceeds a predetermined level, the retarding force of the drum brakes 32 and 33 is overcome so that the shield 22 recedes slowly toward the support frame 20, while maintaining a uniformly high compressing pressure within the forming bale. In this manner, a bale of a uniform and high density is achieved even here.

After the formation of the bale has been completed, the support frame 20 is tilted into the position illustrated in dotted lines in FIG. 2, together with the other frame 21 which includes the shield 22, whereupon the fully formed and tied bale is discharged from the baling chamber 2. After the discharge of the bale from the baling chamber 2, the tiltable frame 20 and the other frame 21 are returned into their original position illustrated in full lines in FIG. 2 and the entire process is repeated for a subsequent bale.

It will be understood that each of the elements described above, or two or more together, may also find a useful application in other types of constructions differing from the types described above.

While the invention has been illustrated and described as embodied in a bale-forming agricultural implement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A mobile baler for hay or like crop material, comprising a baling chamber defining an inlet opening and a bale discharge gate opposite said inlet opening; pick up means including means for feeding the picked up crop material into said inlet opening under a feeding pressure; and openable holding means arranged in said baling chamber between said inlet opening and said discharge gate to stop the incoming crop material until it reaches a predetermined baling pressure and subsequently to pass the baled material towards said discharge gate.

2. The baler as defined in claim 1 wherein said holding means includes at least one flap pivotably connected to the side walls of said baling chamber.

3. The baler as defined in claim 2 including a pair of flaps extending transversely to the feeding direction of the crop material and being hinged to the top and to the bottom of said chamber.

4. The baler as defined in claim 2 wherein said holding means includes an adjustable pressure generator coupled to said flap for holding the same in a closing angular position at which said flap extends across said baling chamber transversely to the feeding direction and to permit the tilting of the flap into an open position when said feeding pressure exceeds the predetermined baling pressure.

5. The baler as defined in claim 4, wherein said pressure generator is a hydraulic or pneumatic cylinder-and-piston unit.

6. The baler as defined in claim 5, wherein said pressure generator further includes a hydraulic pump connected to said hydraulic cylinder-and-piston unit via an adjustable pressure relief valve.

7. The baler as defined in claim 6, wherein said pick up means includes feed driving means operatively coupled to said pressure relief valve to release the baling pressure when the driving means are overloaded.

8. The baler as defined in claim 1 wherein said holding means includes a slidable frame arranged for movement in the feeding direction in said baling chamber, a transverse shield attached to said slidable frame, braking means for exerting a predetermined braking force against said slidable frame and a tiltable frame arranged at the discharge gate to engage and tilt the slidable frame when the latter is displaced by the incoming material from said baling chamber.

9. The baler as defined in claim 8, wherein said braking means includes a drum brake connected to said slidable frame by a pulling means.

10. The baler as defined in claim 1, wherein said feeding means includes a guiding channel communicating with said inlet opening and cooperating with feeding fingers for advancing the picked up crop material under said feeding pressure.

11. The baler as defined in claim 10, further including means for tieing the completed bale between said holding means and said discharge gate.

12. The baler as defined in claim 1, wherein said inlet opening and said discharge gate extends substantially over the entire width of said baling chamber.

* * * * *